United States Patent
Sato et al.

(10) Patent No.: US 6,259,773 B1
(45) Date of Patent: Jul. 10, 2001

(54) TELEPHONE APPARATUS WITH RECORDING AND REPRODUCTION FUNCTIONS

(75) Inventors: Yukio Sato, Yokohama; Shinichi Sato, Miyagi-ken, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/996,218

(22) Filed: Dec. 22, 1997

(30) Foreign Application Priority Data

Dec. 27, 1996 (JP) .................................................. 8-350427

(51) Int. Cl.⁷ .................................................. H04M 1/64
(52) U.S. Cl. .......................................... 379/88.28; 379/357
(58) Field of Search .............................. 379/83, 883.27, 379/88.28, 357, 68; 704/270, 201

(56) References Cited

U.S. PATENT DOCUMENTS

| | | | |
|---|---|---|---|
| 4,677,657 | * 6/1987 | Nagata et al. | 379/88.28 |
| 5,465,401 | * 11/1995 | Thompson | 379/357 |
| 5,633,920 | * 5/1997 | Kikinis et al. | 379/357 |
| 5,794,202 | * 8/1998 | Kim | 704/270 |

* cited by examiner

Primary Examiner—Duc Nguyen
(74) Attorney, Agent, or Firm—Connolly Bove Lodge & Hutz (57) ABSTRACT

A telephone apparatus is disclosed which includes a communication circuit (10) including a microphone (15) and a speaker (14) for providing communication between an operator and a network and outputting sound data from the sound receiving unit and the network; a memory card receiving unit (13); a memory card detector (13a); a memory (4) for storing the sound data; a control circuit (2) responsive to the memory card detector and a recording command for storing the sound data in the memory and reading the sound data from the memory only when the memory card is received by the memory card receiving unit. The memory card stores an ID code and the control circuit registers the identification code on recording. When playing is commanded the control circuit inhibits Playing when the ID from the memory card disagrees with any of registered ID codes. When there is no space in the memory, the control circuit writes the sound data over the sound data only when the ID code from the memory card agrees with one of the registered ID codes. The telephone apparatus further includes a serial interface (23) for storing the sound data in the memory in the memory card.

10 Claims, 7 Drawing Sheets

TELEPHONE APPARATUS WITH RECORDING AND REPRODUCTION FUNCTIONS

BACKGROUND OF THE INVENTION

1. Field of the Invention

This invention relates to a telephone apparatus with recording and playing functions.

2. Description of the Prior Art

A telephone apparatus having a memory for recording and playing sound signals with a protection function are known. In such a prior art telephone apparatus, it is required to input an identification code with ten-keys to play the sound signal.

SUMMARY OF THE INVENTION

The aim of the present invention is to provide an improved telephone apparatus.

According to the present invention, a first telephone apparatus is provided, which comprises: a communication circuit including a microphone and a speaker for providing communication between an operator and a network and outputting sound data from the sound receiving unit and the network; a memory card receiving unit for receiving a memory card having a predetermined size; a memory card detector for generating a detection signal when the memory card is received by the memory card receiving unit, a storing circuit for storing the sound data; a control circuit responsive to the memory card detector and a recording command for storing the sound data in the storing circuit and reading the sound data from the storing circuit only when the memory card is received by the memory card receiving unit.

In the first telephone apparatus, the memory card receiving unit further comprises an interface, the memory card having a memory storing an identification code, and the control circuit reads and stores the identification code from the memory card in the storing circuit with a correspondence with the stored sound data in response to the recording command. In this case, in response to a playing command, the control circuit reads the identification code from the storing circuit and the identification code from the memory card and compares the identification code from the storing circuit with the identification code from the memory card and plays the stored sound data having the correspondence with the identification code from the storing circuit by the speaker when the identification code from the memory card agrees with the identification code from the storing circuit. Moreover, in that case, the control circuit has an address control table to control storing areas of the sound data in the storing circuit. In response to the recording command, the control circuit judges whether there is a space in the storing circuit by checking the address control table. When there is no space, the control circuit collates the identification code from the memory card with the identification codes from the storing circuit. When the identification code from the memory card agrees one of the identification codes from the storing circuit, the control circuit searches one of the storing areas of the sound data having the correspondence with the one of the identification code from the storing circuit agreeing the identification code from the memory card and stores the sound data at the searched storing area.

In the first telephone apparatus, the communication circuit comprises a radio frequency circuit for providing the communication through a radio frequency.

According to the present invention, a second telephone apparatus is provided, which comprises a communication circuit including a microphone and a speaker for providing communication between an operator and a network and outputting sound data from the microphone and the network; a memory card receiving unit for receiving a memory card having a predetermined size and a memory; a memory card detector generating a detection signal when the memory card is received by the memory card receiving unit, a serial data interface for transmitting the sound data to the memory card received by the memory card receiving unit; and a control circuit responsive to the memory card detector for storing the sound data in the memory in the memory card through the serial data interface in response to a recording command and reading the sound data from the memory in the memory card through the serial data interface and playing the read sound data by the speaker when the memory card is received by the memory card receiving unit.

The second telephone apparatus, further includes a registering circuit, wherein the memory card further stores an identification code in the memory and the control circuit reads and registers the identification code from the memory card in the registering circuit in response to the recording command when the memory card is received by the memory card receiving unit. In this case, in response to the playing command, the control circuit reads the identification code from the registering circuit and the identification code from the memory card and compares the identification code from the registering circuit with the identification code from the memory card and plays the stored sound data by the speaker when the identification code from the registering circuit agrees with the identification code from the memory card. Moreover, in that case, the control circuit generates and renews an address control table in the memory of the memory card through that serial interface in response to the recording command, the control circuit judges whether there is a space in the memory by checking the address control table in the memory in response to the recording command, if there is no space in the memory, the control circuit reads the identification code from the memory card and collates the read identification code with identification codes in the registering circuit, the control circuit stores the sound data from the communication circuit only when the read identification code agrees with one of the identification codes.

In the second telephone apparatus, the communication apparatus comprises a radio frequency circuit for providing the communication through a radio frequency.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
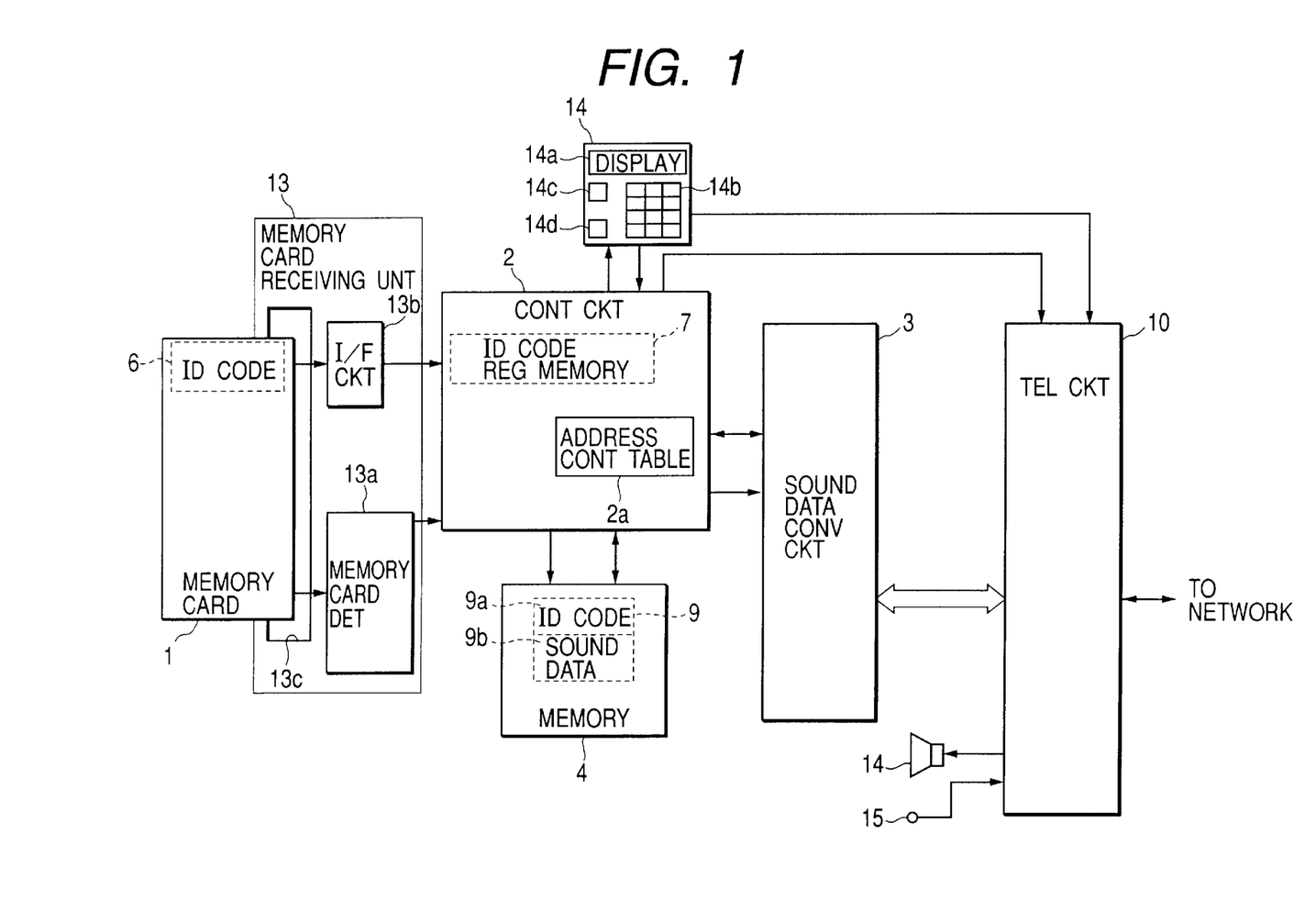
FIG. 1 is a block diagram of a telephone apparatus of a first embodiment.

FIG. 1 is a block diagram of a telephone apparatus of the first embodiment.

The telephone apparatus of the first embodiment comprises a telephone circuit 10 including a speaker 14 and a microphone 15 for providing communication between a network and an operator, a sound data conversion circuit 3 for converting sound signals from the microphone 15 and from the network to sound data and converting sound data into another sound signal played by the speaker 14, a control circuit 2 comprising a microprocessor, a memory 4, a memory card receiving unit 13 including an interface circuit 13b comprising contacts to be coupled to a memory card 1 and a memory card detector 13a, and an operation panel 14, having a display 14a and ten-keys 14b, a recording command key 14c for receiving a recording command operation, and a playing command key 14d for receiving a playing command operation. The ten-keys 14b receives the conventional dialing operation to the telephone circuit 10.

An operator can communicate with a third party through the microphone 15, the speaker 14, the telephone circuit 10, and the network. If the operator calls the third party, the operator dials with the operation panel 14.

The memory card receiving unit 13 having a slot 13c can receive a memory card 1 having a predetermined size. That is, when the operator inserts the memory card 1 into the slot 13c, the memory card detector 13a detects the presence of the memory card 1 and the memory card 1 is coupled to the control circuit 2 through the interface circuit 13b having the contacts, so that the control circuit 2 can read an identification code 6 stored in the memory card 1. Then, the control circuit 2 registers the identification code in an identification code registering memory 7 therein if the recording operation is executed.

When the control circuit 2 receives a recording command from the operation panel 14 (recording mode), the control circuit 2 controls the sound data conversion circuit 3, the memory 4, the telephone circuit 10 to record the sound data from the telephone circuit 10 only when the memory card 1 is inserted. Similarly, when the control circuit 2 receives a playing command from the operation panel 14 (playing mode), the control circuit 2 controls the memory 4, the sound data conversion circuit 3, and the telephone circuit 10 to play the sound data from the memory 4 using the speaker 14 only when the memory card 1 is inserted.

In the recording mode, that is, the recording command is inputted when the memory card 1 is inserted, a sound signal from the microphone 15 and from the network is a/d-converted by the sound data conversion circuit 3 and the control circuit 2 stores the identification code 6 from the memory card 1 and the sound data in a data format 9 at a storing area in the memory 4. The control circuit 2 having an address control table 2a stores the top and end addresses of the storing area of the stored sound data.

In the playing mode, that is, the playing command is inputted when the memory card 1 is inserted, the sound data is read from the memory 4 with address data from the address control table 2a and the read sound data is supplied to the speaker 14 through d/a-conversion by the sound data conversion circuit 3 and the telephone circuit 10.

Figure 2:
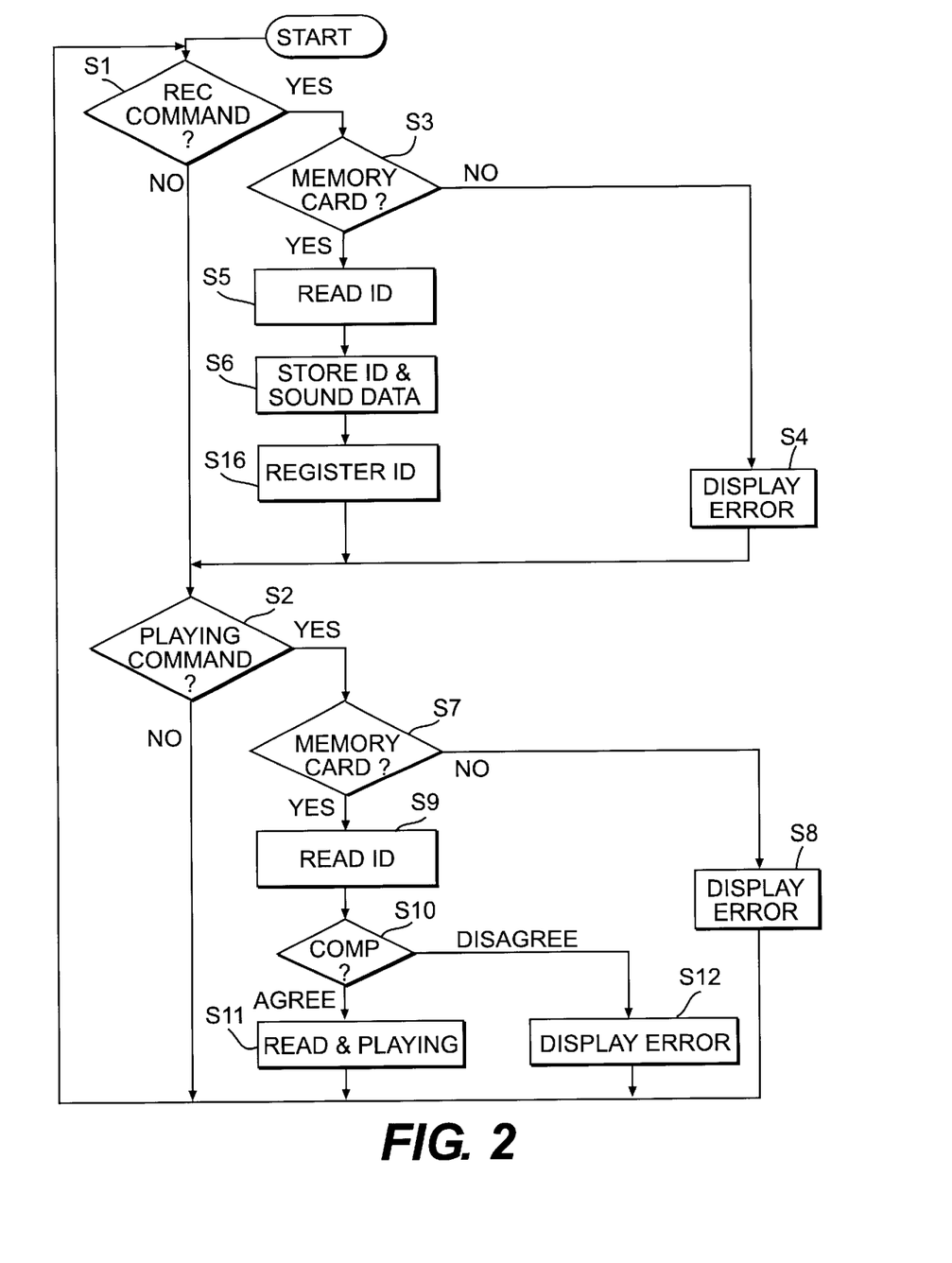
FIG. 2 depicts a flow chart of the first embodiment showing the operation of the control circuit in FIG. 1.

FIG. 2 depicts a flow chart of the first embodiment showing the operation of the control circuit 2.

The control circuit 2 checks whether the recording command is present in step s1. If there is no recording command in step s1, the control circuit 2 checks whether the playing command is present in step s2. If there is no playing command in step s2, processing returns to step s1.

If there is the recording command in step s1, the control circuit 2 checks whether there is the memory card 1 in the memory card receiving unit 13 in step s3. If there is no memory card in the memory card receiving unit 13 in step s3, the control circuit 2 informs the operator of an erroneous operation on the display 14a in step s4. If there is the memory card 1 in the memory card receiving unit 13 in step s3, the control circuit 2 reads the identification code 6 from the memory card 1 and stores the sound data in the memory 4 having the data format 9 at the storing area. That is, the sound data 9b is stored together with the identification code 6 from the memory card 1 as the identification code 9b. In other words, the sound data 9b is stored with a correspondence with the identification code 9a. The control circuit 2 stores the top and end address in the address control table in step s6. In the following step s16, the control circuit 2 registers the identification code 6 from the memory card 1 in the identification code registering memory 2. After steps s4 and s16 processing proceeds to step s2.

If there is the playing command in step s2, the control circuit 2 checks whether there is the memory card 1 in the memory card receiving unit 13 in step s7. If there is no memory card in the memory card receiving unit 13 in step s7, the control circuit 2 informs the operator of an erroneous operation on the display 14a in step s8. If there is the memory card 1 in the memory card receiving unit 13 in step s7, the control circuit 2 reads the identification code 6 from the memory card 1 and compares the read identification code 6 with the identification code 9a stored together with the desired sound data 9b in the memory 4. If the identification code 6 from the memory cared 1 agrees with the identification code 9a in the memory 4, the control circuit 2 reads the sound data 9b stored together with the identification code 9a in the memory 4 and plays it by the speaker 14 through the sound data conversion circuit 3 and the telephone circuit 10 in step s11. If the identification code 6 form the memory card 1 disagrees with the identification code 9a in the memory 4, the control circuit 2 informs the operator of an erroneous operation or an inhibited operation in step s12. After steps s8, s11, and s12 processing returns to step s1.

In the first embodiment, it is inhibited to reproduce the sound data when the identification code disagrees with the registered identification code which have been registered on the recording operation.

In the above operation the identification code 6 is checked during the playing operation. However, this operation may be omitted. That is, after the step s9, processing directly proceeds to step s11. This means the checking operation is executed only by checking the presence of the memory card 1. In this case, it is inhibited to play the sound data 9b in the memory 4 when the memory card 1 is not inserted.

In this embodiment the sound data is stored in the memory 4 via the control circuit 2. However, it is also possible to stored the sound data from the sound data conversion circuit 3 in the memory 4 directly through the DMA method.

A second embodiment will be described.

Figure 3:
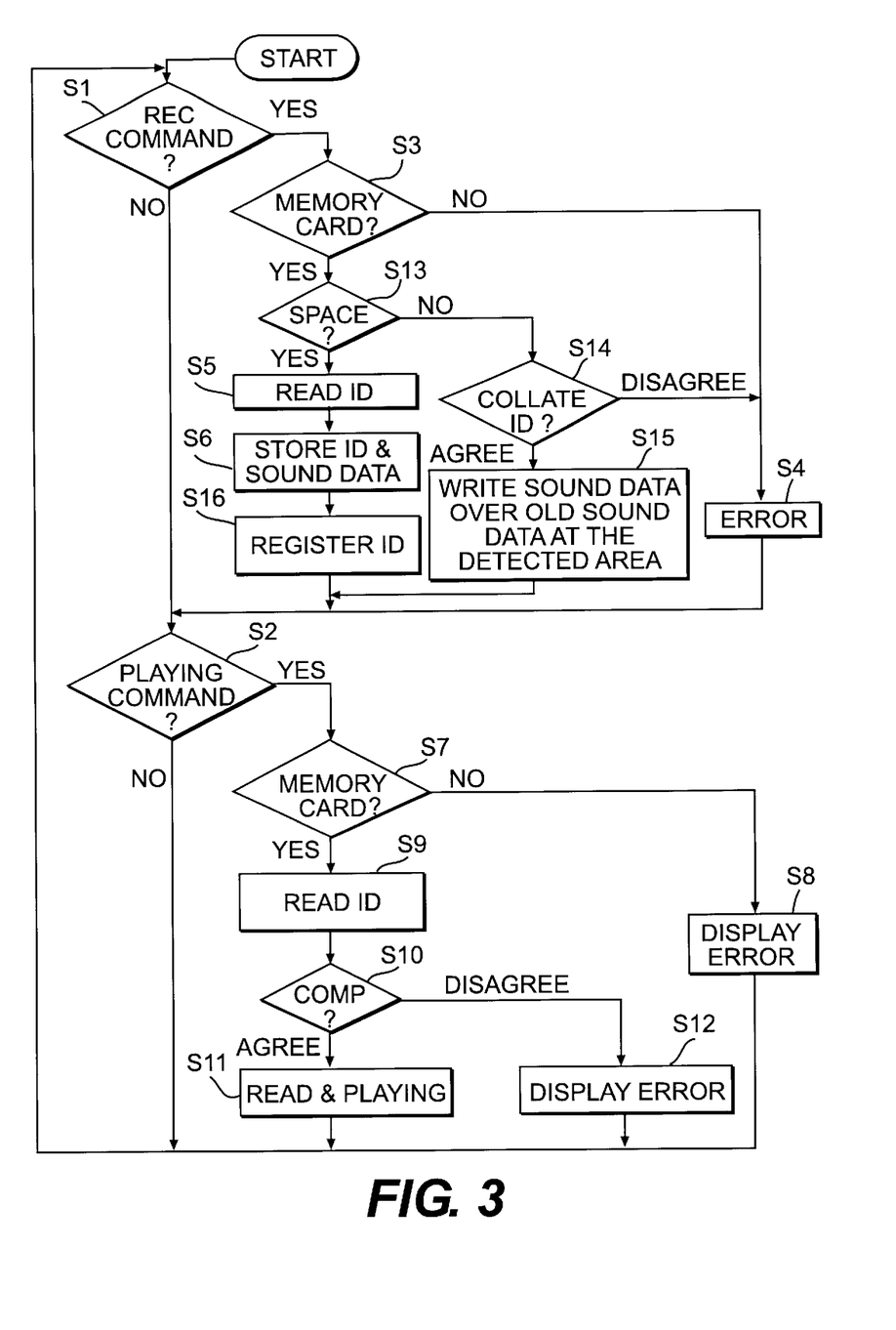
FIG. 3 depicts a flow chart of the second embodiment showing the operation of the control circuit in FIG. 1.

The telephone apparatus of the second embodiment has substantially the same structure as that of the first embodiment. The difference is that the control circuit 2 stores the sound data in the recording mode in consideration of the space in the memory 4.

FIG. 3 depicts a flow chart of the second embodiment showing the operation of the control circuit 2.

The operation in FIG. 3 is substantially the same as that in FIG. 2. The difference is that steps s13 to s15 are added.

In the recording mode, after step s3, the control circuit 2 checks whether there is a space for recording the sound data in step s13. If there is a space for recording the sound data in step s13, processing proceeds to step s5 and reads the identification code 6 and stores the sound data with the identification code 6 as similar to the first embodiment.

In step s13, if there is no space for recording the sound data, the control circuit 2 collates the identification code 6 from the memory card 1 with the identification codes in the identification code registering memory 7. If there is an identification code in the identification code registering memory 7 agreeing the identification code from the memory card 1, the control circuit 2 reads the top and end addresses of the storing area of the sound data storing the identification code from the address control table 2a and stores the sound data from the sound data conversion circuit 3 at the detected storing area, that is, the control circuit 2 writes the new sound data over the sound data which have been written at the detected storing area.

In step s14, if there is no identification code in the identification code registering memory 7 agreeing the identification code 6 from the memory card 1, processing proceeds to step s4 to inform the user of an erroneous operation (no space in the memory 4) in step s4.

In the second embodiment, it is inhibited to write new sound data over the old sound data in the memory 4 if the identification code in the memory card 1 disagrees with the identification codes registered in the identification code registering memory 7. That is, only recording command from the person who has recorded the sound data in the memory 4 can be received.

A third embodiment will be described.

Figure 4:
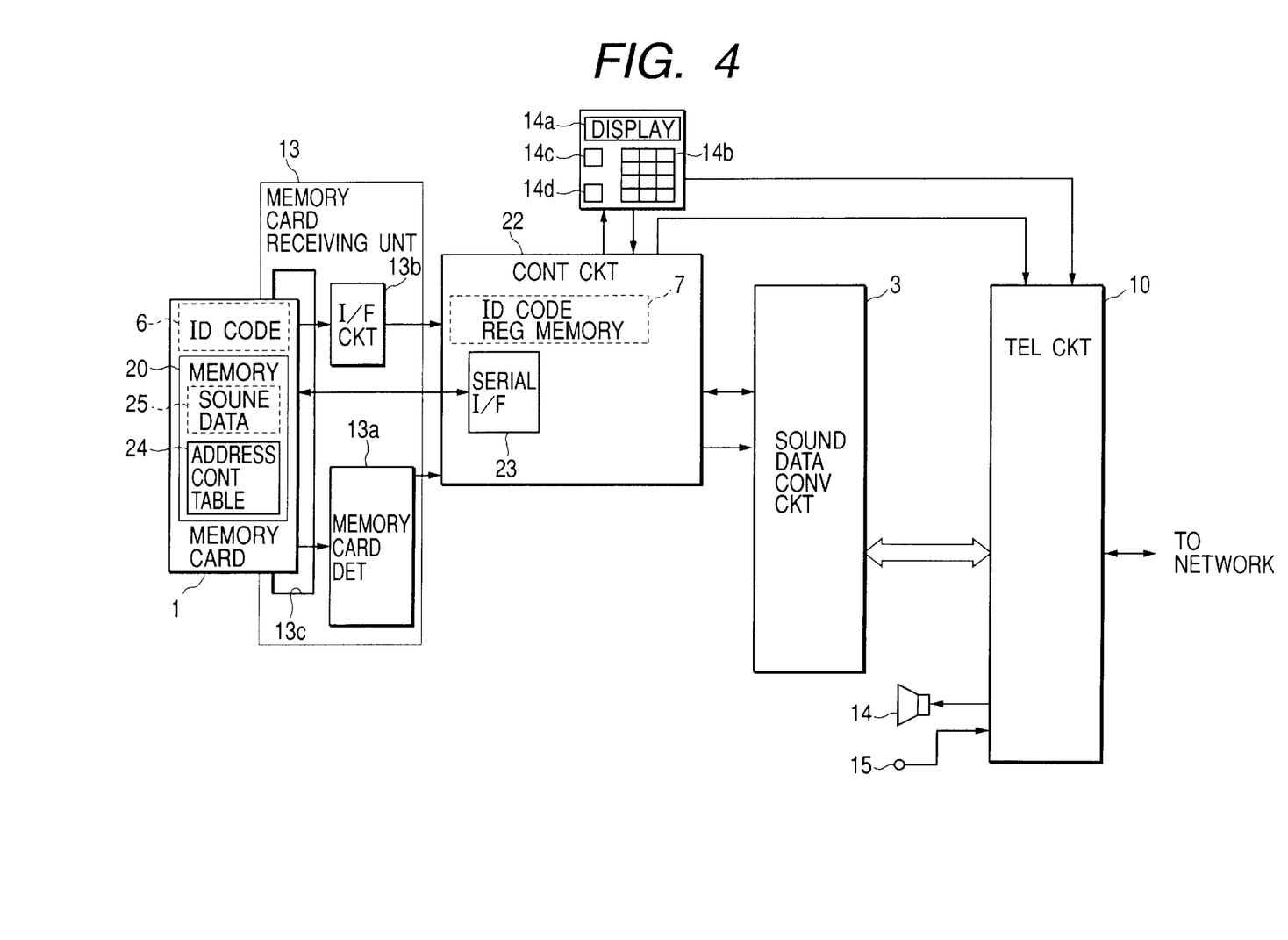
FIG. 4 is a block diagram of a telephone apparatus of a third embodiment.

FIG. 4 is a block diagram of a telephone apparatus of the third embodiment.

The telephone apparatus of the third embodiment has substantially the same structure as that of the first embodiment. The difference is that the memory card 1 has a memory 20, the control circuit 22 has a serial interface circuit 23 for sending sound data to and receiving sound data from the memory card 1, and the memory 4 is omitted.

Moreover, an address control table 24 is generated in the memory card 1 in response to the first recording command. Then, in response to the following recording command, the address control table 24 is renewed by the control circuit 22. Further, the playing command is inhibited if the identification code 6 in the memory card disagrees with any one of the identification codes which have been registered in the identification code registering memory 7.

When the control circuit 22 receives the recording command from the operation panel 14, the control circuit 22 controls the sound data conversion circuit 3, the serial interface circuit 23, the telephone circuit 10 to record the sound data from the telephone circuit 10 when the memory card 1 is inserted and there is a space in the memory card 1. Then, the identification code in the memory card 1 is read from the memory card 1 and registered in the identification code registering memory 7.

Similarly, when the control circuit 22 receives the playing command from the operation panel 14, the control circuit 22 controls the serial interface circuit 23, the sound data conversion circuit 3, and the telephone circuit 10 to play the sound data 25 from the memory card 1 using the speaker 14 only when the memory card 1 is inserted and the identification code registered in the identification code registering memory 7 agrees with the identification code 6 from the memory card 1.

In recording mode, that is, the recording command is inputted while the memory card 1 is inserted, a sound signal from the microphone 15 and from the network is a/d-converted by the sound data conversion circuit 3 and the control circuit 22 stores the sound data 25 in the memory 20 of the memory card 1. Then, the control circuit 22 sends and stores the top and end addresses of the storing area of the stored sound data to the memory card 1. If the following recording command comes from the memory card 1 of which identification code 6 has been registered, the control circuit reads the address control table 24 at first to renew the address control table 24.

In playing mode, that is, when the playing command is inputted while the memory card 1 is inserted and the identification code 6 in the memory card 1 has been registered in the identification code registering memory 7, the sound data is read from the memory card 1 with address data from the address control table 24 and the read sound data is supplied to speaker 14 through d/a-conversion by the sound data conversion circuit 3 and the telephone circuit 10.

Figure 5:
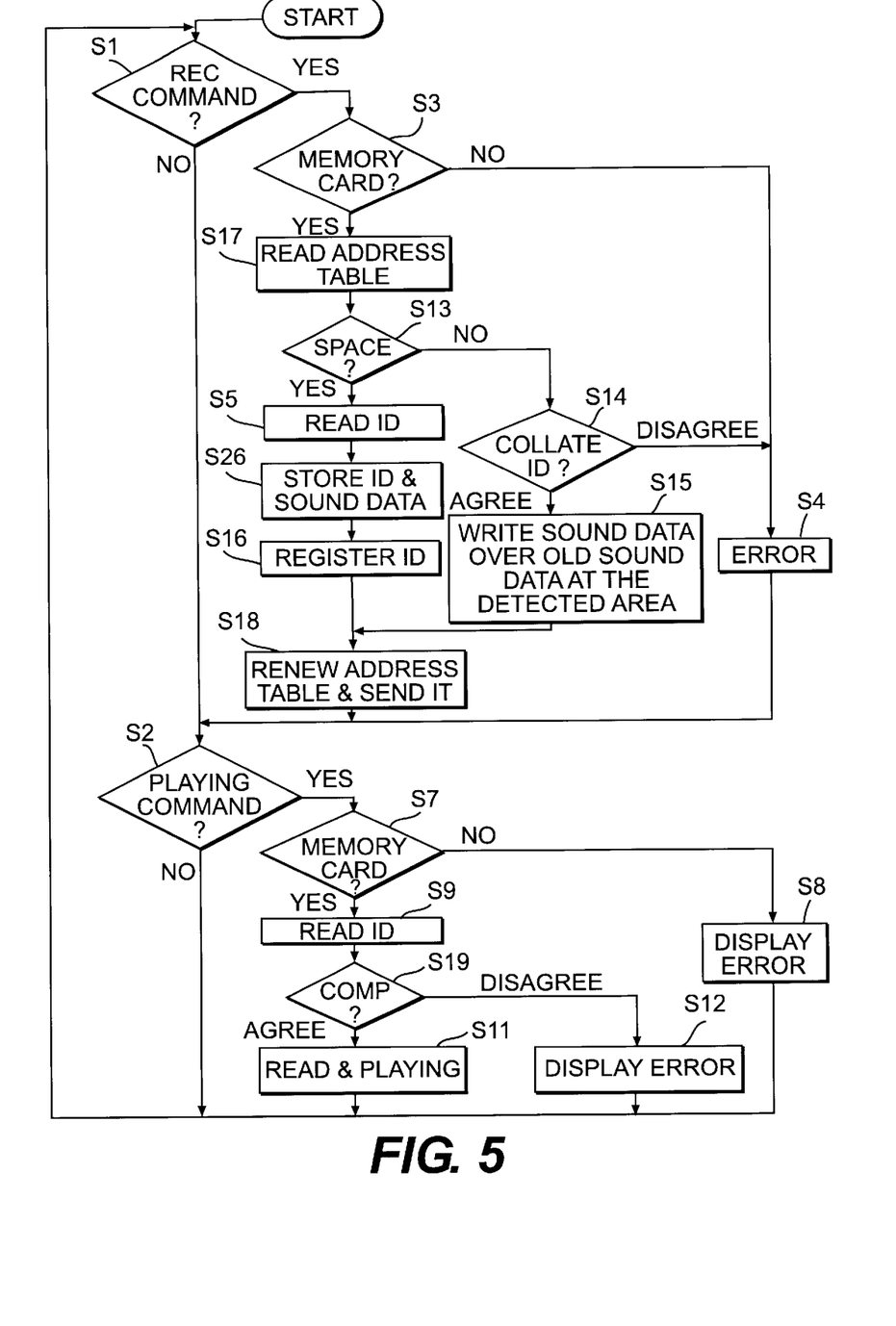
FIG. 5 depicts a flow chart of the third embodiment showing the operation of the control circuit in FIG. 4.

FIG. 5 depicts a flow chart of the third embodiment showing the operation of the control circuit 22 in FIG. 4.

The control circuit 22 checks whether the recording command is present in step s1. If there is no recording command in step s1, the control circuit 2 checks whether the playing command is present in step s2. If there is no playing command in step s2, processing returns to step s1.

If there is the recording command in step s1, the control circuit 22 checks whether there is the memory card 1 in the memory card receiving unit 13 in step s3. If there is no memory card in the memory card receiving unit 13 in step s3, the control circuit 22 informs the operator of an erroneous operation on the display 14a in step s4. If there is the memory card 1 in the memory card receiving unit 13 in step s3, the control circuit 22 reads the address table 24 from the memory card 1 through the serial interface circuit 23 in step s17. In the following step s13, the control circuit 22 checks whether there is a space for recording the sound data in step s13 by checking the address control table 24. If there is a space for recording the sound data in step s13, processing proceeds to step s5 where the control circuit 22 reads the identification code 6 in the memory card 1 and stores the sound data in the memory 20 in step s26. In the following step s16, the control circuit registers the identification code 6 from the memory card 1 in the identification code registering memory 7.

In step s13, if there is no space for recording the sound data, the control circuit 22 collates the identification code 6 from the memory card 1 with the identification codes in the identification code registering memory 7. If there is an identification code in the identification code registering memory 7 agreeing the identification code from the memory card 1, the control circuit 22 reads the top and end addresses of the storing area of the sound data storing the identification code from the address control table 24 and stores the sound data from the sound data conversion circuit 3 at the detected storing area of the memory card 1, that is, the control circuit 22 writes the new sound data over the sound data which have been written at the detected storing area of the memory card 1 in step s15.

After the steps s15 and s16, the control circuit 2 stores the top and end address in the address control table in step s18, that is, the control circuit 2 renews the address control table 24 in the memory 20 of the memory card 1 in step s18.

In step s14, if there is no identification code in the identification code registering memory 7 agreeing the identification code from the memory card 1, processing proceeds to step s4 to inform the user of an erroneous operation (no space) in step s4.

If there is the playing command in step s2, the control circuit 22 checks whether there is the memory card 1 in the memory card receiving unit 13 in step s7. If there is no memory card in the memory card receiving unit 13 in step s7, the control circuit 22 informs the operator of an erroneous operation on the display 14a in step s8. If there is the memory card 1 in the memory card receiving unit 13 in step s7, the control circuit 22 reads the identification code 6 from the memory card 1 and compares the read identification codes with the identification code in the identification code registering memory 7 in step s19. If the identification code from the memory cared 1 agrees with one of the identification codes in the identification code registering memory 7, the control circuit 22 reads the sound data in the memory card 1 and plays it by the speaker 14 through the serial interface circuit 23, the sound data conversion circuit 3 and the telephone circuit 10. If the identification code from the memory card 1 disagrees with any of identification codes in the identification code registering memory 7, the control circuit 22 informs the operator of an erroneous operation in step s12. After step s8, s11, and s12 processing returns to step s1.

In the third embodiment, it is inhibited to play the sound data in the memory card 1 when the memory card is not inserted. Moreover, it is inhibited to play the sound data when the identification code 6 from the memory card 1 disagrees with any one of the registered identification codes which have been registered on the recording operation, so that it is inhibited to play the sound data which have been recorded in another telephone apparatus.

A fourth embodiment will be described.

Figure 6:
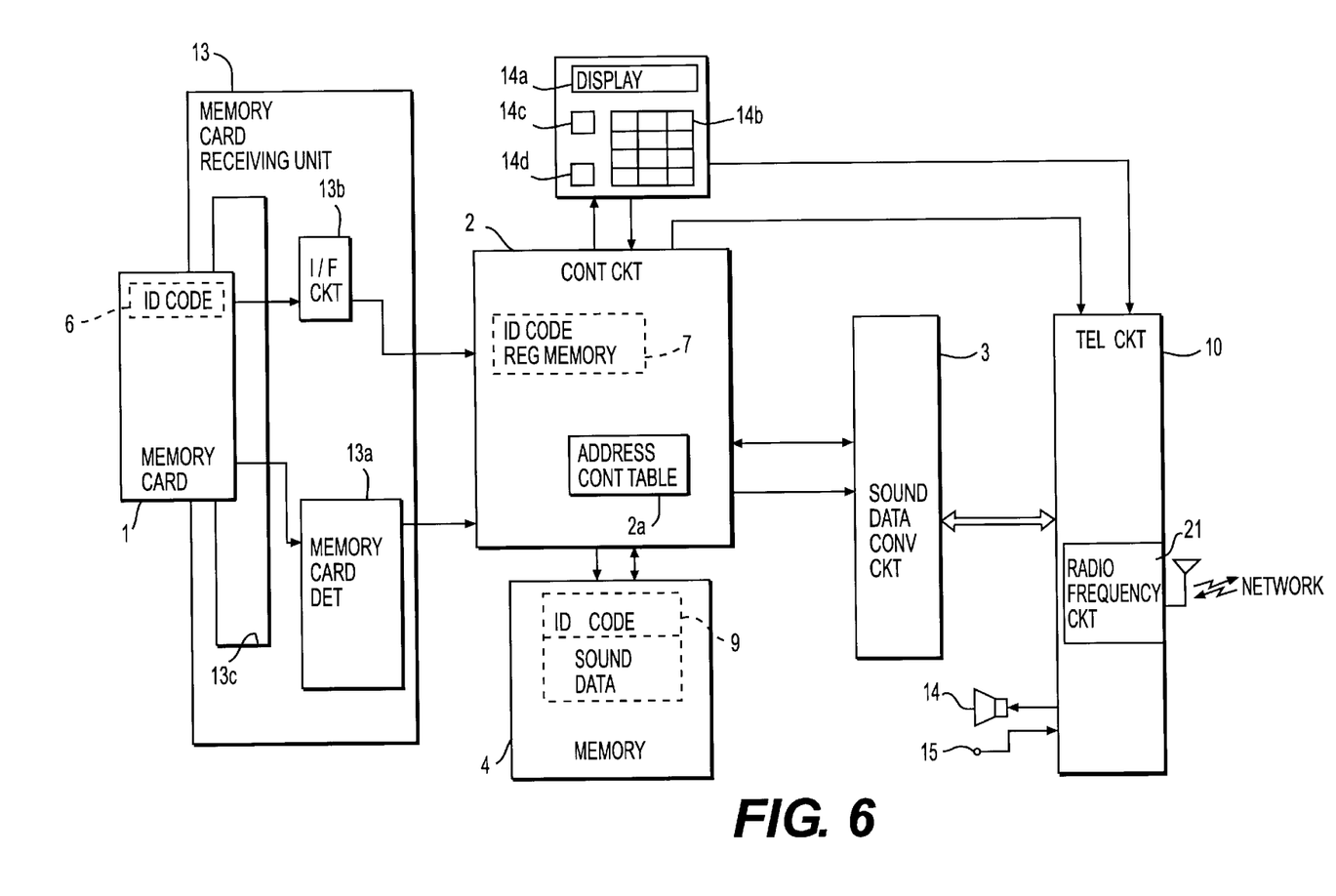
FIG. 6 is a block diagram of a telephone apparatus of a fourth embodiment.

FIG. 6 is a block diagram of a telephone apparatus of the fourth embodiment.

The telephone apparatus of the fourth embodiment has substantially the same structure as that of the first embodiment. The difference is that the communication circuit comprises a radio frequency circuit 21 for providing a communication through a radio frequency. The communication circuit 10 communicates with a network through the radio frequency signal via a base station (not shown) using the radio frequency circuit 21. Other operations are similar to the first embodiment.

A fifth embodiment will be described.

Figure 7:
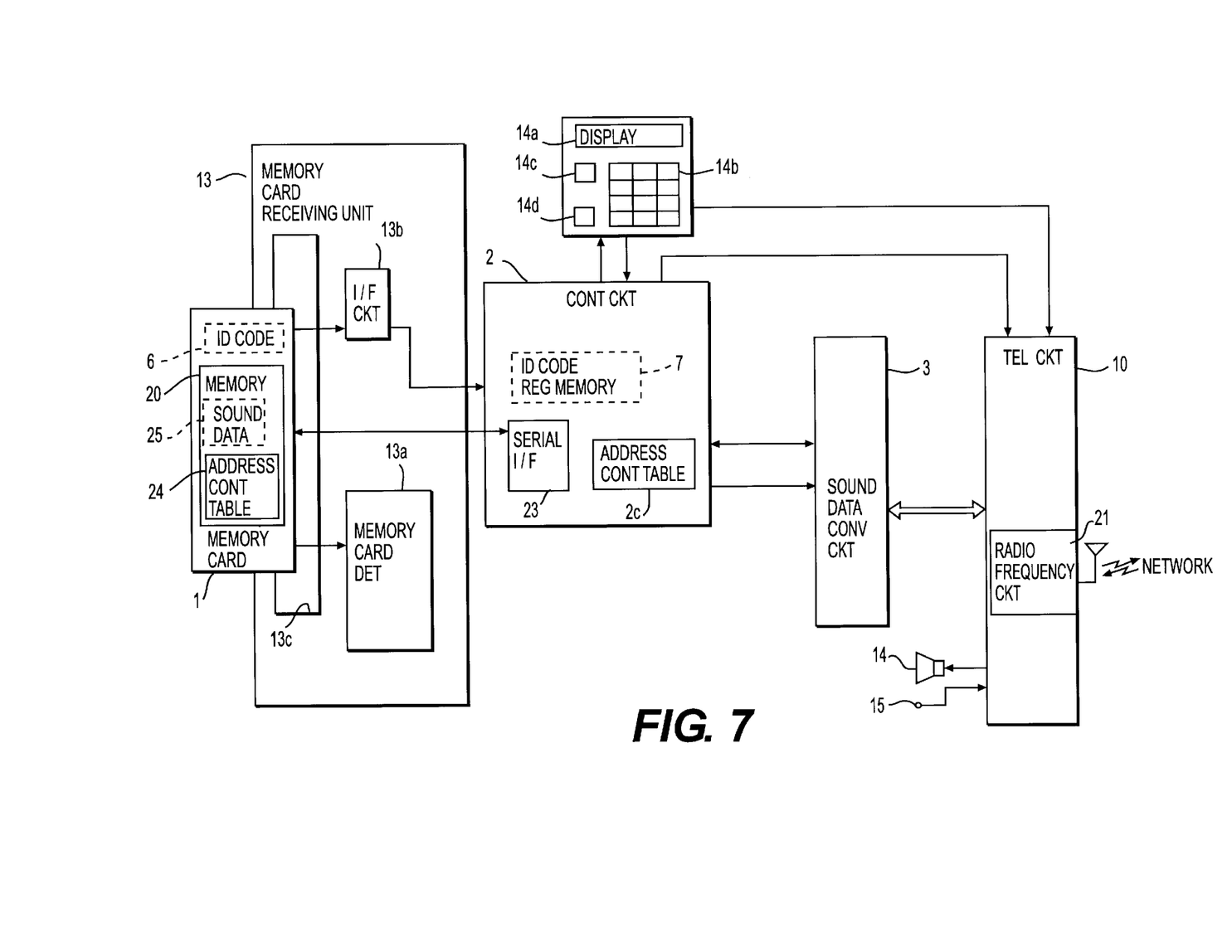
FIG. 7 is a block diagram of a telephone apparatus of a fifth embodiment.

FIG. 7 is a block diagram of a telephone apparatus of the fifth embodiment.

The telephone apparatus of the fifth embodiment has substantially the same structure as that of the third embodiment. The difference is that the communication circuit comprises a radio frequency circuit 21 for providing a communication through a radio frequency. The communication circuit communicates with a network through the radio frequency signal via a base station (not shown) using the radio frequency circuit 21. Other operations are similar to the third embodiment.

What is claimed is:

1. A telephone apparatus comprising:

communication means including sound receiving means and sound reproducing means for providing communication between an operator and a network and outputting sound data from said sound receiving means and said network;

memory card receiving means for receiving a memory card having a predetermined size;

memory card detection means for generating a detection signal when said memory card is received by said memory card receiving means, storing means for storing said sound data; and control means responsive to said memory card detection means and a recording command for storing said sound data in said storing means and reading said sound data from said storing means only when said memory card is received by said memory card receiving means.

2. A telephone apparatus as claimed in claim 1, wherein said memory card receiving means further comprises an interfacing means, said memory card having a memory storing an identification code, and said control means reads and stores said identification code from said memory card in said storing means with a correspondence with the stored sound data in response to said recording command.

3. A telephone apparatus as claimed in claim 2, wherein, in response to a playing command, said control means reads said identification code from said storing means and said identification code from said memory card and compares said identification code from said storing means with said identification means from said memory card and plays the stored sound data having said correspondence with said identification code from said storing means by said sound playing means when said identification code from said memory card agrees with said identification code from said storing means.

4. A telephone apparatus as claimed in claim 2, wherein said control means having an address control table to control storing areas of said sound data in said storing means, in response to said recording command, said control means judges whether there is a space in said storing means by checking said address control table, when there is no space, said control means collates said identification code from said memory card with said identification codes from said storing means, and when said identification code from said memory card agrees one of said identification codes from said storing means, said control means searches one of said storing areas of said sound data having said correspondence with said one of said identification code from said storing means agreeing said identification code from said memory card and stores said sound data at the searched storing area.

5. A telephone apparatus comprising:

communication means including sound receiving means and sound playing means for providing communication between an operator and a network and outputting sound data from said sound receiving means and said network;

memory card receiving means for receiving a memory card having a predetermined size and a memory;

memory card detection means generating a detection signal when said memory card is received by said memory card receiving means, serial data interfacing means for transmitting said sound data to said memory card received by said memory card receiving means; and control means responsive to said memory card detection means for storing said sound data in said memory in said memory card through said serial data interface means in response to a recording command and reading said sound data from said memory in said memory card through said serial data interfacing means and playing the read sound data by said sound playing means in response to a playing command when said memory card is received by said memory card receiving means.

6. A telephone apparatus as claimed in claim 5, further comprising registering means, wherein said memory card further stores an identification code in said memory and said control means reads and registers said identification code from said memory card in said registering means in response to said recording command when said memory card is received by said memory card receiving means.

7. A telephone apparatus as claimed in claim 6, wherein, in response to said playing command, said control means reads said identification code from said registering means and said identification code from said memory card and compares said identification code from said registering means with said identification code from said memory card and plays the stored sound data by said sound playing means when said identification code from said registering means agrees with said identification code from said memory card.

8. A telephone apparatus as claimed in claim 6, wherein said control means generates and renews an address control table in said memory of said memory card through said serial interface in response to said recording command, said control means Judges whether there is a space in said memory by checking said address control table in said memory in response to said recording means, if there is no space in said memory, said control means reads said identification code from said memory card and collates the read identification code with identification codes in said registering means, said control means stores said sound data from said communication means only when the read identification code agrees with one of said identification codes.

9. A telephone apparatus as claimed in claim 1, wherein said communication apparatus comprises a radio frequency circuit for providing said communication through a radio frequency.

10. A telephone apparatus as claimed in claim 5, wherein said communication apparatus comprises a radio frequency circuit for providing said communication through a radio frequency.

* * * * *